United States Patent

Fujisawa

(10) Patent No.: US 6,743,843 B2
(45) Date of Patent: Jun. 1, 2004

(54) SILICONE GEL COMPOSITION

(75) Inventor: Tsunetoshi Fujisawa, Hachioji (JP)

(73) Assignee: Three Bond Co., Ltd., Tokyo (JP)

(*) Notice: Subject to any disclaimer, the term of this patent is extended or adjusted under 35 U.S.C. 154(b) by 0 days.

(21) Appl. No.: 10/221,847

(22) PCT Filed: Mar. 15, 2001

(86) PCT No.: PCT/JP01/02067

§ 371 (c)(1),
(2), (4) Date: Sep. 16, 2002

(87) PCT Pub. No.: WO01/68732

PCT Pub. Date: Sep. 20, 2001

(65) Prior Publication Data

US 2003/0050387 A1 Mar. 13, 2003

(30) Foreign Application Priority Data

Mar. 17, 2000 (JP) .......................... 2000-075923

(51) Int. Cl.⁷ .............................. C08K 5/54; C08L 83/07
(52) U.S. Cl. ................ 524/268; 524/265; 524/266; 524/267; 524/588
(58) Field of Search ................. 524/265, 266, 524/267, 268, 588; 528/25, 26, 28, 38

(56) References Cited

U.S. PATENT DOCUMENTS

| | | | | | |
|---|---|---|---|---|---|
| 4,528,081 A | * | 7/1985 | Lien et al. | ..................... | 522/39 |
| 4,675,346 A | * | 6/1987 | Lin et al. | ..................... | 522/39 |
| 5,254,657 A | * | 10/1993 | Inoue | ..................... | 528/17 |
| 5,348,986 A | * | 9/1994 | Chu et al. | ..................... | 522/37 |
| 5,378,734 A | * | 1/1995 | Inoue | ..................... | 522/11 |
| 5,714,524 A | * | 2/1998 | Hara et al. | ..................... | 522/99 |
| 5,872,170 A | * | 2/1999 | Mine et al. | ................. | 524/440 |
| 6,020,409 A | * | 2/2000 | Alvarez et al. | ............. | 524/267 |

FOREIGN PATENT DOCUMENTS

| EP | 0 363 071 A2 | 4/1990 |
|---|---|---|
| EP | 0 421 643 A2 | 4/1991 |
| JP | 54-4980 | 1/1979 |
| JP | 11-49836 | 2/1999 |

* cited by examiner

*Primary Examiner*—Jeffrey B. Robertson
(74) *Attorney, Agent, or Firm*—Sughrue Mion, PLLC

(57) ABSTRACT

The invention provides a vibration-absorbing silicone gel composition mainly comprising: 100 parts by weight of (a) an organopolysiloxane having a (meth)acryloyl group in its molecule; from 5 to 100 parts by weight of (b) an organopolysiloxane unreactive with ingredient (a); from 1 to 50 parts by weight of (c) an amorphous pulverization product of a three-dimensionally crosslinked silicone resin; from 1 to 20 parts by weight of (d) a fumed silica; and an effective amount of (e) a polymerization initiator, as a gel composition which has high vibration-absorbing properties and high shape retention and which can be used as, e.g., a vibration-absorbing damper even when it is not sealed up in a container or bag.

7 Claims, No Drawings

SILICONE GEL COMPOSITION

TECHNICAL FIELD

The present invention relates to a vibration-absorbing silicone gel composition. More particularly, the invention relates to a silicone gel having excellent vibration-absorbing properties which is for use as a damper or insulator in electrical/electronic appliances.

BACKGROUND OF THE INVENTION

Electronic appliances to be mounted on vehicles, such as sound facilities, measuring instruments, video appliances, and recorders have hitherto employed vibration-proof dampers so as to prevent vibrations or impacts from being transmitted to the electronic appliances. Especially in the appliances in which reading/writing in recording media is conducted by means of an optical pickup, such as CDs, MDs, and DVDs, it is essential to employ dampers or insulators because the precision of reading is impaired by vibrations.

Dampers which absorb vibrations by means of an elastic material such as a coil spring were devised previously. Thereafter, ones comprising a coil spring and a silicone oil or silicone gel sealed up therein were devised because it is difficult to attenuate vibrations with the elastic material alone.

Furthermore, there have been cases where a structure which is formed by injecting a gel material or foam material into a container or bag made of a substance such as a rubber and sealing the container or bag and which employs no spring or the like is used as a damper as described in Japanese Patent Laid-Open Nos. 208534/1995 and 44342/1999. As the material to be sealed up in such a damper is generally used a silicone gel having a penetration of about from 70 to 200.

Such a vibration-absorbing gel desirably is a material having high damping properties and having a large value of loss tangent tanδ in a measurement of coefficient of dynamic viscosity.

However, as described in Japanese Patent Laid-Open No. 123321/1994, there also is a desire for the use of a gel material which has not been sealed up in a container and is in an exposed state, as in the case of a damper having a structure comprising a cylindrical shell, a gel material held in the shell, and a support shaft held in the gel material and a damper material for use in the parts for fixing a plate spring supporting a movable part equipped with the objective of an optical pickup.

In this case, when the gel material has poor shape retention, the gel sags with vibrations or deforms according to vibrations to become unable to recover the original shape. As a result, the gel material has impaired damping properties and, in the worst case, comes not to function as a gel at all. In general, a gel composition having a large value of tanδ has low shape retention and, hence, changes in shape with an intense vibration or impact. Consequently, in dampers having a gel not sealed up in a container or bag, the gel used should be a hard gel having shape retention at least on a given level. It has hence been impossible to attain a gel having high vibration-absorbing properties.

The invention relates to a highly vibration-absorbing silicone gel composition which eliminates the problems described above, has excellent shape retention, and can be used as a damper even in the state of being not sealed up in a container or bag.

DISCLOSURE OF THE INVENTION

As a result of extensive investigations made in order to overcome the problems described above, a vibration-absorbing silicone gel composition mainly comprising: 100 parts by weight of (a) an organopolysiloxane having a (meth)acryloyl group in its molecule; from 5 to 100 parts by weight of (b) an organopolysiloxane unreactive with ingredient (a); from 1 to 50 parts by weight of (c) an amorphous pulverization product of a three-dimensionally crosslinked silicone resin; from 1 to 20 parts by weight of (d) a fumed silica; and an effective amount of (e) a polymerization initiator, could be obtained.

BEST MODE FOR CARRYING OUT THE INVENTION

The invention will be described below in detail. Ingredient (a) used in the invention is an organopolysiloxane having a (meth)acryloyl group in the molecule. The term (meth)acryloyl group herein is a general term for acryloyl and methacryloyl. (Meth)acryloyl groups undergo a polymerization reaction with the aid of an active radical, which will be described below.

The organopolysiloxane as the backbone is an oligomer made up of linearly polymerized siloxane bonds. The silicon atom of each siloxane bond has further two bonds for linkage, which are monovalent hydrocarbon groups, preferably alkyl groups having 1 to 4 carbon atoms or aryl groups. The number of repetition of the siloxane bonds is from 50 to 10,000.

Ingredient (a) will have different crosslink densities on the number and positions of the (meth)acryloyl groups in the molecule, and is preferably designed to be suitable for gels. For example, it is preferred to use the organopolysiloxane described in Japanese Patent Laid-Open No. 184257/1994. However, ingredient (a) is not limited thereto, and any organopolysiloxane can be used as long as the molecule has been designed to attain a low crosslink density.

Preferred as ingredient (a) in the invention is an organopolysiloxane obtained by reacting a compound selected from vinyl-containing isocyanates, acrylic anhydride, methacrylic anhydride, acryloyl halides, and methacryloyl halides with an amino-terminated organopolysiloxane represented by the following general formula 1:

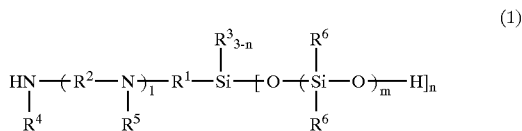

(1)

(wherein $R^1$ and $R^2$ are divalent hydrocarbon groups, preferably alkylene groups having 1 to 4 carbon atoms or arylene groups such as phenylene; $R^3$ is a monovalent hydrocarbon group, preferably an alkyl group having 1 to 4 carbon atoms or an aryl group; $R^4$ is hydrogen or a monovalent hydrocarbon group, preferably an alkyl group such as methyl or an arylalkyl group such as benzyl; $R^5$ is hydrogen or a monovalent hydrocarbon group or substituted hydrocarbon group, preferably allyl, an alkyl group, or a di- or trialkoxysilylalkyl group; $R^6$ is a monovalent hydrocarbon group, preferably an alkyl group having 1 to 4 carbon atoms or an aryl group; l is an integer of 0 to 4; n is an integer of 1 to 3; and m is an integer of 50 to 10,000).

The organopolysiloxane having an amino group at an end, which is represented by general formula 1, is obtained by causing an organosiloxane having a silanol group at an end to add to an organoalkoxysilane having an amino group. Subsequently, this organopolysiloxane is reacted with an isocyanate compound having at least one (meth)acryloyl group serving as a radical-curable functional group to thereby cause an isocyanate group to add to an amino group. Alternatively, the organopolysiloxane is reacted with (meth) acrylic anhydride or a (meth)acryloyl halide to thereby cause a (meth)acryloyl group to add to the amino group. Thus, the preferred ingredient (a) for use in the invention is produced. These reactions proceed quantitatively with great ease without necessitating a catalyst.

Although each reactant to be used can be suitably selected from compounds known in the relevant field, typical examples thereof are as follows. Typical examples of the organoalkoxysilane having an amino group are represented by general formula 2:

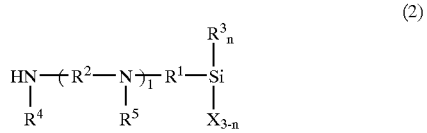

(wherein $R^1$ and $R^2$ are divalent hydrocarbon groups, preferably alkylene groups having 1 to 4 carbon atoms or arylene groups such as phenylene; $R^3$ is a monovalent hydrocarbon group, preferably an alkyl group having 1 to 4 carbon atoms or an aryl group; $R^4$ is hydrogen or a monovalent hydrocarbon group, preferably an alkyl group such as methyl or an arylalkyl group such as benzyl; $R^5$ is hydrogen or a monovalent hydrocarbon group or substituted hydrocarbon group, preferably allyl, an alkyl group, or a di- or trialkoxysilylalkyl group; X is an alkoxy group; n is 0 or 1; and l is an integer of 0 to 4). Specific examples of these compounds include (β-aminoethyl)-β-aminoethyltrialkoxysilanes, (β-aminoethyl)-γ-aminopropyltrialkoxysilanes, (β-aminopropyl)-β-aminoethyltrialkoxysilanes, (γ-aminopropyl)-γ-aminopropyltrialkoxysilanes, aminopropyltrialkoxysilanes, aminopropylmethyldialkoxysilanes, 3-[N-allyl-N(2-aminoethyl)]aminopropyltrimethoxysilane, N,N-bis [(methyldimethoxysilyl)propyl]amine, N,N-bis[3-trimethoxysilyl)propyl]ethylenediamine, and the like.

Specific examples of the (meth) acryloyl-containing isocyanate include methacryloyl isocyanate, 2-isocyanatoethyl methacrylate, and (meth) acrylates containing an isocyanate group which are obtained by reacting a compound having two or more isocyanate groups, such as 2,4-tolylene diisocyanate, 2,6-tolylene diisocyanate, or 1,5-naphthalene diisocyanate, with a (meth) acrylate having a hydroxyl group, such as 2-hydroxyethyl methacrylate or 2-hydroxypropyl methacrylate. It is possible to use (meth) acrylic anhydride or (meth) acryloyl halides, e.g., (meth) acryloyl chloride, in place of these isocyanate compounds.

This reaction readily proceeds when a vinyl-containing isocyanate or another compound is added to the amino-containing organosiloxane usually in an amount of 1 mol or larger per mol of the organosiloxane and these ingredients are mixed with slight heating at about 50° C.

Ingredient (b) in the invention functions as a plasticizer and a diluent, and is a diorganopolysiloxane unreactive with ingredient (a). Although typical examples of ingredient (b) are diorganopolysiloxanes terminated by trimethylsilyl and cyclic diorganopolysiloxanes, a dimethylpolysiloxane terminated by a silanol at each end may be used as long as it is unreactive with ingredient (a). However, in the case where ingredient (a) has a group reactive with silanols, e.g., an alkoxy group, then dimethylpolysiloxanes terminated by a silanol at each end are unsuitable. It is also preferred to add ingredient (b) after the production of ingredient (a) because addition of ingredient (b) before completion of the production of ingredient (a) may result in an inadequate molar proportion of ingredient (a).

The amount of ingredient (b) to be added is from 5 to 100 parts by weight per 100 parts by weight of ingredient (a). In case where the amount thereof is smaller than 5 parts by weight, the resultant gel has impaired vibration-absorbing properties. When it exceeds 100 parts by weight, there are cases where ingredient (b) oozes out of the cured gel or the gel has reduced shape retention and collapses. The molecular weight of ingredient (b) is preferably from 1,000 to 100,000. For example, in the case where the silicone gel according to the invention is to be used for electronic parts, ingredient (b) is preferably one having a molecular weight of from 5,000 to 10,000 from the standpoint of preventing ingredient (b) from volatilizing into the air.

The amorphous pulverization product of a three-dimensionally crosslinked silicone resin, ingredient (c), in the invention is a product obtained by pulverizing a three-dimensionally crosslinked high-molecular organopolysiloxane having a molecular weight of from several thousands to several hundred thousands. It has a particle diameter of from 0.1 μm to 50 μm. As ingredient (c) can be used, for example, trade name "Trefil R-900", "Trefil R-902A", or "Trefil R-910", manufactured by Dow Corning Toray Silicone Co., Ltd., or the like.

The amount of ingredient (c) to be added is from 1 to 20 parts by weight per 100 parts by weight of ingredient (a). In case where the amount thereof is smaller than 1 part by weight, the resultant cured gel has impaired shape retention, i.e., has such reduced shape-retaining ability that it breaks or sags with an intense vibration. In case where the amount thereof is larger than 20 parts by weight, vibration-absorbing properties are reduced.

The fumed silica as ingredient (d) in the invention serves, when used together with ingredient (a), to heighten the strength of the cured resin. Namely, it can impart high shape retention to the gel formed. In addition, ingredient (d) and ingredient (c) interact and thereby enable the cured silicone gel to have enhanced vibration-absorbing properties.

The fumed silica may be any of known fumed silicas having a surface area of at least 50 $m^2/g$. Preferred are silicas having a surface area larger than 200 $m^2/g$ and smaller than 400 $m^2/g$. This is because these silicas are commercially easily available materials. The fumed silica preferably has a surface area of from 200 to 250 $m^2/g$.

The amount of ingredient (d) to be added is from 1 to 20 parts by weight per 100 parts by weight of ingredient (a). In case where the amount thereof is smaller than 1 part by weight, not only the resultant cured gel has impaired shape retention and reduced vibration-absorbing properties but also ingredient (b) is apt to ooze out of the cured gel. In case where the amount thereof is larger than 20 parts by weight, the result is a hard gel, which has reduced vibration-absorbing properties.

Ingredient (e) in the invention serves to generate an active-radical species or the like upon heating or light irradiation to thereby polymerize ingredient (a). Ingredient (e) is already known as an organic peroxide or photoinitiator. Based on the selection of ingredient (e), a desired mode of curing can be selected, such as thermal curability, photocurability, two-pack mixing type, or anaerobic curability.

As the organic peroxide can be used a known one. Examples thereof include hydroperoxides such as cumene hydroperoxide, t-butyl hydroperoxide, p-menthane hydroperoxide, methyl ethyl ketone peroxide, cyclohexane peroxide, dicumyl peroxide, and diisopropylbenzene hydroperoxide, and further include ketone peroxides, diallyl peroxides, peroxyesters, and the like.

As the photoinitiator can be suitably used a known photopolymerization catalyst. Examples thereof include acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, p-diacetylbenzene, 3-methoxybenzophenone, 4-allylacetophenone, 4-methylbenzophenone, 4-chloro-4-benzylbenzophenone, 3-chloroxanthone, 3,9-dichloroxanthone, 3-chloro-8-nonylxanthone, benzoyl, benzoylmethyl ether, benzoin butyl ether, bis(4-dimethylaminophenyl) ketone, benzyl methoxy ketal, 2-chlorothioxanthone, diethoxyacetophenone, and the like.

The amount of ingredient (e) to be added can be suitably determined in a known range so as to result in desired curability. Although the amount thereof may be generally in the range of from 0.01 to 10% by weight based on the total weight of the oligomer of ingredient (a), it is generally preferably in the range of from 0.1 to 5% by weight.

Storage stability improvers, antioxidants, colorants and the like may be added to the gel composition of the invention as long as they do not impair the concept of the invention.

Since the gel composition of the invention has excellent vibration-absorbing properties, it can be used as actuator dampers for optical pickups, the dampers of decks to be mounted on vehicles, and the like.

EXAMPLES

To 2,000 g of a silanol-terminated polydimethylsiloxane (molecular weight, 10,000) is added 16.3 g of aminopropyldimethoxysilane. This mixture is stirred and reacted at 100° C. for 2 hours with nitrogen replacement. Thereafter, the excess aminopropyltrimethoxysilane was removed under vacuum by suction to obtain a polydimethylsiloxane terminated at one end by amino and having a viscosity of 10,000 cps. To 100 g of the resin obtained was added 0.77 g of 2-isocyanatoethyl methacrylate. This mixture was stirred and reacted at 50° C. for 1 hour with nitrogen replacement to obtain (A) as ingredient (a).

A 500-cSt dimethylpolysiloxane having a trimethylsilyl group at an end (TMDMS) was added as ingredient (b) in the amounts shown in Table 1.

Fumed silica (Aerosil 200, manufactured by Nippon Aerosil Co., Ltd.) was incorporated as ingredient (c) in the amounts shown in Table 1.

An amorphous pulverization product of a three-dimensionally crosslinked silicone resin (Trefil R-900, manufactured by Dow Corning Toray Silicone Co., Ltd.; average particle diameter, 20 βm) was incorporated as ingredient (d) in the amounts shown in Table 1.

Furthermore, 1-hydroxycyclohexyl phenyl ketone was added as ingredient (e) in the amount shown in Table 1. Thus, ultraviolet-curable silicone compositions were obtained.

As compounds for Comparative Examples were used calcium carbonate, rubber particles, and a hollow filler. The rubber particles used were fine urethane acrylate polymer particles UPX-15 having a particle diameter of 15 (manufactured by Sekisui Plastics Co., Ltd.). The hollow filler used was hollow fine calcium carbonate particles MFL-100CA having a particle diameter of 100 $\mu$m (manufactured by Matsumoto Yushi Co., Ltd.).

The silicone compositions obtained above were injected into a transparent container having a diameter of 30 mm and a depth of 1.2 mm. The silicone compositions were cured by irradiation with ultraviolet in an integrated quantity of light of 30 kJ/m$^2$ using a 4-kW high-pressure mercury lamp (main wavelength, 365 nm).

The cured silicones were taken out and examined with a rheometer for vibration-absorbing properties. With the rheometer were determined loss tangent tanδ and storage modulus G' at 25° C. and 1 Hz. The value of tanδ, which indicates the ability to absorb vibrations, is preferably from 0.5 to 0.7. Gels having a value of tanδ lower than 0.5 have poor vibration-absorbing properties and are unsuitable for use as a damper material. The value of G', which indicates the shape retention of the cured gel, is preferably 700 or higher. Gels having a value of G' lower than 700 deform with vibrations or impacts, resulting in a phenomenon such as sagging.

The results thereof and the proportion of each ingredient in each composition per 100 parts by weight of (A) are shown in Table 1.

TABLE 1(1)

| | Example | | | | | | | | |
|---|---|---|---|---|---|---|---|---|---|
| | 1 | 2 | 3 | 4 | 5 | 6 | 7 | 8 | 9 |
| (A) | 100 | 100 | 100 | 100 | 100 | 100 | 100 | 100 | 100 |
| TMDMS | 10 | 50 | 90 | 40 | 40 | 40 | 40 | 40 | 40 |
| Silicone resin pulverization product | 20 | 20 | 20 | 20 | 20 | 20 | 5 | 20 | 40 |
| Fumed Silica | 10 | 10 | 10 | 3 | 8 | 20 | 10 | 10 | 10 |
| Polymerization Initiator | 1.2 | 1.2 | 1.2 | 1.2 | 1.2 | 1.2 | 1.2 | 1.2 | 1.2 |
| tan δ | 0.51 | 0.58 | 0.68 | 0.62 | 0.59 | 0.59 | 0.63 | 0.61 | 0.59 |
| G' | 862 | 815 | 713 | 764 | 778 | 814 | 734 | 747 | 768 |

TABLE 1(2)

| | Comparative Example | | | | | | | | |
|---|---|---|---|---|---|---|---|---|---|
| | 1 | 2 | 3 | 4 | 5 | 6 | 7 | 8 | 9 |
| (A) | 100 | 100 | 100 | 100 | 100 | 100 | 100 | 100 | 100 |
| TMDMS | 0 | 130 | 40 | 40 | 40 | 40 | 40 | 40 | 40 |
| Silicone resin pulverization product | 20 | 20 | 0 | 70 | 20 | 20 | | | |
| Fumed silica | 10 | 10 | 10 | 10 | 0 | 30 | 10 | 10 | 10 |
| Polymerization initiator | 1.2 | 1.2 | 1.2 | 1.2 | 1.2 | 1.2 | 1.2 | 1.2 | 1.2 |
| Calcium carbonate | | | | | | | 20 | | |
| Rubber particles | | | | | | | | 20 | |
| Hollow filler | | | | | | | | | 20 |
| tan δ | 0.31 | 0.84 | 0.44 | 0.42 | 0.38 | 0.41 | 1.22 | 0.41 | 0.4 |
| G' | 906 | 622 | 706 | 890 | 711 | 742 | 218 | 642 | 653 |

INDUSTRIAL APPLICABILITY

The invention provides a silicone gel composition which readily cures and gels upon light irradiation, heating, or the like. Since the cured gel has high shape retention, it neither sags nor changes in shape in response to vibrations. In addition, because the gel has high vibration-absorbing properties despite its high shape retention, it can be used as a vibration-absorbing damper or the like not sealed up in a container or bag.

What is claimed is:

1. A vibration-absorbing silicone gel composition mainly comprising:
   100 parts by weight of (a) an organopolysiloxane having a (meth) acryloyl group in its molecule;
   from 5 to 100 parts by weight of (b) an organopolysiloxane unreactive with ingredient (a);
   from 1 to 50 parts by weight of (c) an amorphous pulverization product of a three-dimensionally crosslinked silicone resin;
   from 1 to 20 parts by weight of (d) an atomized silica; and
   an effective amount of (e) a polymerization initiator.

2. The vibration-absorbing silicon gel composition according to claim 1, wherein ingredient (a) is obtained by reacting a compound selected from (meth) acryloyl group-containing isocyanates, acrylic anhydride, methacrylic anhydride, acryloyl halides and methacryloyl halides, with an amino-terminated organopolysiloxane represented by the following general formula 1:

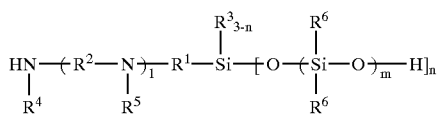

(wherein R and R are divalent hydrocarbon groups; $R^3$ is a monovalent hydrocarbon group; $R^4$ is hydrogen or a monovalent hydrocarbon group; R5 is hydrogen or a monovalent hydrocarbon group or substituted hydrocarbon group; $R^6$ is a monovalent hydrocarbon group; 1 is an integer of 0 to 4; n is an integer of 1 to 3; and m is an integer of 50 to 10,000).

3. The vibration-absorbing silicone gel composition according to claim 2, wherein the amino-terminated organopolysiloxane is obtained by causing an organosiloxane having a silanol group at an end to add to an amino-containing organoalkoxysilane represented by the following general formula 2:

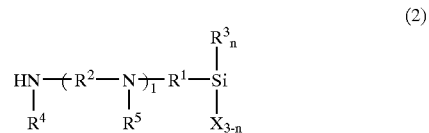

(wherein $R^1$ and $R^2$ are divalent hydrocarbon groups; $R^3$ is a monovalent hydrocarbon group; $R^4$ is hydrogen or a monovalent hydrocarbon group; $R^5$ is hydrogen group or a monovalent hydrocarbon group or substituted hydrocarbon group; X is an alkoxy group; n is 0 or 1; and 1 is an integer of 0 to 4).

4. The vibration-absorbing silicone gel composition according to claim 2, wherein $R^1$ and $R^2$ are alkylene groups having 1 to 4 carbon atoms or arylene groups; $R^3$ is an alkyl group having 1 to 4 carbon atoms or an aryl group; $R^4$ is an alkyl group or an arylalkyl group; $R^5$ is allyl, an alkyl group or a di- or trialkoxysilylalkyl group; and $R^6$ is an alkyl group having 1 to 4 carbon atoms or an aryl group.

5. The vibration-absorbing silicone gel composition according to claim 4, wherein $R^1$ and $R^2$ are alkylene groups having 1 to 4 carbon atoms or phenylene; and $R^4$ is methyl or benzyl.

6. The vibration-absorbing silicone gel composition according to claim 3, wherein $R^1$ and $R^2$ are alkylene groups having 1 to 4 carbon atoms or arylene groups; $R^3$ is an alkyl group having 1 to 4 carbon atoms or an aryl group; $R^4$ is an alkyl group or an arylalkyl group; $R^5$ is allyl, an alkyl group or a di- or trialkoxysilylalkyl group; and $R^6$ is an alkyl group having 1 to 4 carbon atoms or an aryl group.

7. The vibration-absorbing silicone composition according to claim 6, wherein $R^1$ and $R^2$ are alkylene groups having 1 to 4 carbon atoms or phenylene; and $R^4$ is methyl or benzyl.

* * * * *